Sept. 24, 1940.     J. N. MOWERY     2,215,932
IRRIGATION SYSTEM
Filed May 26, 1936     2 Sheets-Sheet 1

INVENTOR
John N. Mowery
By
ATTORNEY

Sept. 24, 1940.    J. N. MOWERY    2,215,932
IRRIGATION SYSTEM
Filed May 26, 1936    2 Sheets-Sheet 2

INVENTOR
John N. Mowery
By
ATTORNEY

Patented Sept. 24, 1940

2,215,932

UNITED STATES PATENT OFFICE 2,215,932

IRRIGATION SYSTEM

John N. Mowery, Worcester, Mass.

Application May 26, 1936, Serial No. 81,835

3 Claims. (Cl. 137—78)

My invention relates to irrigation systems and particularly to improvements in spray irrigation systems of the portable type.

All irrigation methods contemplate supplementing the natural rainfall to the end that the roots of growing plants may be surrounded by soil containing moisture in that amount necessary to secure optimum plant activity. Too little moisture dries out soil bacteria and too much moisture displaces the air in the soil and destroys the bacteria necessary to convert mineral elements into a form in which they become available for plant food. In the earliest attempts at irrigation, water was conducted in open ditches that followed the contour of the ground in a gradual descending gradient and by stopping the main ditch and opening up laterals, water was diverted and overflowed the surface of the soil. Experience demonstrated that it was most difficult to secure a uniform distribution. Moreover, since it is necessary to harrow the ground after irrigation, it is necessary to open up all laterals prior to each subsequent irrigation.

To avoid the necessity of building main ditches and opening up laterals, and also to enable water to be carried over ascending gradients, another plan or system was developed. In its simplest form it involves a pumping outfit and surface laid conductor pipe. In some cases the water was discharged from the end of the pipe and overflowed the ground. In other cases, outlets were provided at intervals along the conductor pipe and the volume broken up into a series of small streams flowing by gravity. In all cases where the entire surface is not flooded, lateral travel of the moisture depends on capillary action of the soil and such action is quite limited in extent.

Use of these methods results either in an excess of moisture in the zones where the distribution streams are discharged and a shortage in the zones between the streams, or, when the surface is flooded, the air in the soil is driven out and the bacteria destroyed. A later development contemplates discharging the water in a manner simulating rain and takes two forms—both requiring permanent installations. One system requires underground mains, laterals and branches with outlets, consisting of vertical pipes or risers each terminating in a sprinkler head; the outlets being spaced at regular intervals and at such a distance apart that the discharge from adjacent outlets would cover with approximate uniformity, all the area between the outlets. The second form requires underground mains and laterals with outlets, or risers, terminating in a horizontal conductor line fitted with small nozzles, all in line and spaced 3' to 10' apart on the conductor line. This conductor line is caused to oscillate through an arc of about forty-five degrees on each side of the vertical. Both of these forms are superior to the first two developments but can only be used on crops that are intensively cultivated and of high unit value, because of the expense involved in making the original installation.

Where any substantial area must be irrigated, the cost of laying underground mains and pipe lines equipped with nozzle outlets so positioned and spaced as to provide a fairly uniform distribution of water over the entire field is prohibitive. The quantity of water required to produce effective results is large and hence the pipes or mains designed to carry the same, and particularly where a large number of nozzles is simultaneously operated therefrom, must be of large diameter in order to prevent high friction losses.

In irrigating citrus fruit orchards, for example, where there may be 3,000 trees growing 25 feet apart in parallel rows 300 to 400 feet long, the cost either of permanent subsurface or surface pipes with sprinkler heads or sprays effectively disposed to wet all portions of each tree is so far out of proportion to the benefits to be obtained as to be entirely impracticable. On the other hand, I find that the combination of an underground main or mains, with portable distributor pipes and sprinkler tubes which can be quickly laid on top of the ground and connected with the mains, and which, although of such large water carrying capacity as to reduce frictional losses to a minimum are of such light weight that they may be easily carried from place to place, constitute a practical solution of the irrigation problem at a cost well within allowable economic limits.

Any irrigation system of the character contemplated by my invention, in order to be commercially acceptable, should conform to substantially all of the following requirements:

1. The water distribution over the area requiring irrigation should be uniform.

2. The rate of distribution should be such as to avoid either run-off or saturation of the ground surface.

3. The water discharged from each outlet must not be atomized; otherwise large quantities of water will be absorbed by the atmosphere in periods of low humidity.

4. The pressure at the discharge outlets must be as low as possible to accomplish requirements 1, 2 and 3 and at the same time reduce the amount of power required.

5. The area covered by each outlet and the volume discharged should be correlated so that in a predetermined unit of time the equivalent of a definite number of inches of rain may be applied. For example, 1″ of rain in 30 minutes over a unit area would be a convenient measure.

6. The sprinkler heads, or outlets, should be located at approximately the center of each rectangular block of four trees when irrigating orchards or groves.

7. Approximately uniform pressure should be automatically maintained at all sprinkler heads from one up to the maximum number that may be simultaneously operated with a given water supply.

8. The sprinkler heads should be small and compact to avoid damage in handling portable pipe.

9. The sprinkler heads should be readily detachable for cleaning when clogged.

10. The orifices in the sprinkler head should be large to prevent clogging.

11. The sprinkler head should have no moving parts.

12. The irrigation system should be adapted to distribute water economically to various sections of the grove, orchard or field, for purposes other than irrigation, such as for spraying insecticides, fungicides and the like.

13. Provision should be made to operate the sprinkler heads close to the ground or when desired, to operate them at an elevation above the tops of the trees so as to wash the foliage and if possible, entrain nitrogen and convey it to the tree roots.

14. The fixed charges, interest and depreciation, plus operating costs, fuel, oil, supplies, labor and maintenance, must be at a minimum.

15. Reliability and continuity of operation are prime requisites.

None of the systems involving underground mains, laterals and portable pipe, in use at the present time, will fully and completely meet the primary requirements set forth above and the system covered by this application was designed and developed with a view to providing more completely the ideal conditions.

The principal objects of my invention are to provide an irrigation system having the foregoing desirable characteristics, and with this in view, my invention includes the novel elements and the combinations and arrangements thereof described below and illustrated in the accompanying drawings in which—

Figure 1:
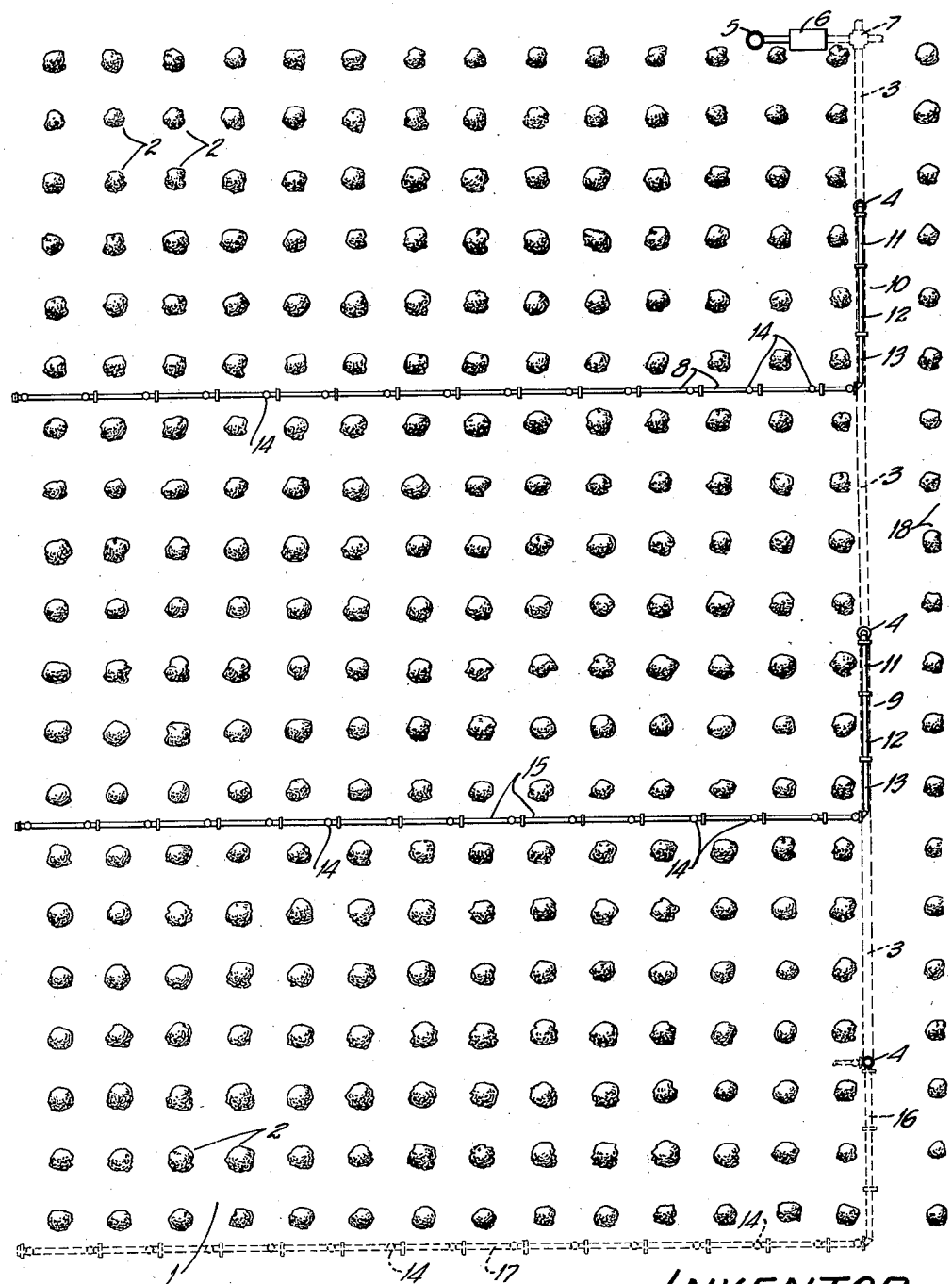
Fig. 1 is a plan view of a section of land to be irrigated having trees or other vegetation growing thereon in parallel rows, and showing the general location of the fixed mains, and several of the portable distributor and sprinkler pipes.

Referring to the drawings and particularly to Fig. 1 which is understood to be purely illustrative, 1 represents generally a rectangular section of land to be irrigated on which are growing trees 2 disposed at equal distances apart in parallel rows. An underground main 3 is provided with hydrant-like outlets 4 extending above the surface of the ground and spaced apart along said main at distances equal to some even multiple of the row and tree spacing. In the present case, the outlets are midway between adjacent tree rows and seven tree rows apart along the main. Water is supplied to the main from a suitable source such as a well 5 from which the water is pumped by pump 6 and delivered to the mains through the T connection 7. Appropriate regulators are applied to the pump so that the pressure in the mains is maintained substantially constant, preferably at around 20 pounds per square inch, irrespective of the number of sprinkler heads in operation.

The length of the tree rows normal to the main and midway between which the sprinkler pipe 8, hereinafter described, is to be laid, more or less controls the proper spacing of the outlets 4 in the main and hence the length of the portable distributor pipes 9 and 10 which are connected to the outlets. In the illustration shown, and assuming the trees and rows to be 25 feet apart, the length of the tree rows normal to the main is 325 feet and the outlets 4 are spaced 175 feet apart. With this layout, the distributor pipes may comprise three lengths of tube, 11, 12, and 13, the last length of which 13 extends at right angles to the pipe line and is adapted to be coupled to the sprinkler pipe 8. The length, of course, of the distributor pipe from the outlet to the portion at right angles is 75 feet. It should also be observed that the tube lengths going to make up the distributor pipe are such that the removal of successive intermediate lengths will make the distributor pipe of proper length to couple to the sprinkler pipe when the latter is moved to positions between tree rows successively nearer the outlet.

At the start of the irrigating operation, the distributor pipe 10, for example, is connected to one of the outlets 4. The sprinkler pipe 8 is laid between the furthest rows of trees which can be reached by the three lengths of distributor tubes and the whole is coupled thereto. The water is then turned on by means of a valve on outlet 4 and is discharged from the sprinkler heads 14 which are positioned along the sprinkler pipe in the center of the square formed by each four trees.

Another distributor pipe 9 and its corresponding sprinkler pipe 15 is laid and connected up together and to the next adjacent outlet. The water is then turned on and this sprinkler is put in operation. A third distributor pipe 16 and its associated sprinkler pipe 17 is then laid, connected up to the next adjacent outlet 4 and placed in operation.

The irrigation crew then returns to the sprinkler first placed in operation. The pipe 8 is uncoupled and moved to a position between the rows of trees next nearer the outlet. The middle tube length 12 of the distributor pipe is uncoupled and removed and the length 13 having the right angle therein is coupled to the length 11 at one end and to the adjacent end of the sprinkler pipe; the water is turned on and irrigation begins in this zone. Likewise the pipes 15 and 17 are successively moved to positions between the rows of trees next nearer their respective outlets and irrigation commenced between these rows. The system is so designed that the men in the irrigation crew work continuously. For example, with only two men using three sprinkler pipes 375 to 400 feet in length it is possible, by successively moving the pipes as above described, to irrigate twenty rows of trees with the equivalent of two inches of rainfall quickly and economically with only six moves after the sprinklers are first placed in operation.

Where another section 18 of the orchard lies to the right of the main shown in Fig. 1, it may be irrigated from the same outlets and with the same distributor pipes provided the main 3 is positioned midway between the orchard sections. Where the main is located at one side, as in Fig. 1, an extra short length of distributor pipe is necessary to position the sprinkler heads properly between the trees in section 18 and this is coupled between the distributor pipe as shown and the sprinkler pipe.

In order that the details of my system may be clearly understood, a description of the various elements employed will now be given.

The mains, distributor pipes and sprinkler pipes comprise thin sheet metal tubes and those which are used above the ground are equipped at the ends with flanged elements welded thereto which cooperate with rotatable locking rings to function as quick acting couplings. These are, of course, not necessary on the underground main, and the tubes there may be welded together or connected by any standard form of coupling. In the main, sheet steel of a 10 gauge thickness will be found sufficient and for the portable tubes used above ground a 16 gauge thickness is ample. Steel of 16 gauge thickness weights only about 2½ pounds per square foot so that tubes of substantial length and substantial diameter are easily portable.

The diameter of the mains depends upon the length and the rate of flow of the water necessarily carried therethrough to supply the maximum number of sprinklers operating at one time. Generally speaking, mains 8 inches in diameter near the pumping station and 6 inches in diameter nearer the ends of the line will be found sufficient to carry about 400 gallons per minute at a pressure of 20 pounds. Above ground, the tubes used both in the distributor and the sprinkler need not be larger than 4 inches outside diameter unless the sprinkler lines extend more than about 400 feet in length.

Figure 2:
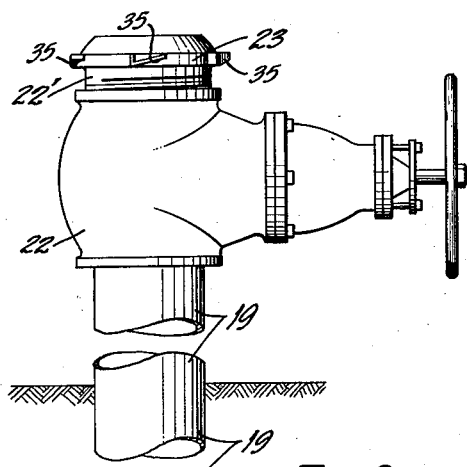
Fig. 2 is an elevation view of an outlet from the main.
Figure 3:
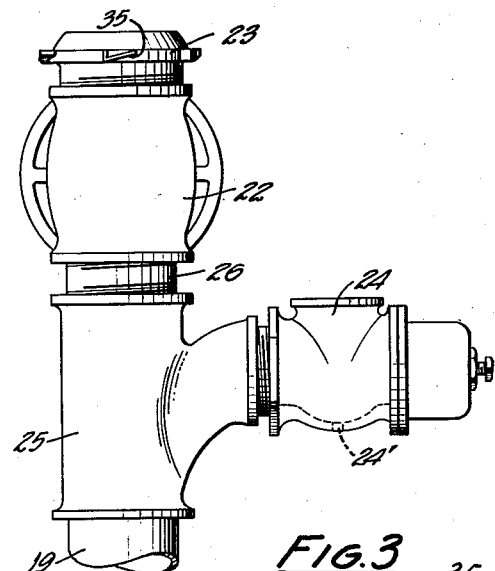
Fig. 3 is an elevation view of an outlet having an automatic relief valve associated therewith.

Referring to Figs. 2 and 3, 3 is the main and, in order that the outlet pipe 19 may be fairly rigid, I prefer to use a 4 inch cast iron pipe as a riser. In order to connect this to the tubular main 3 a standard union 20 is welded to the tube as shown at 21. The pipe 19 is threaded therein and a standard 4 inch valve 22 is threaded to the top of pipe 19. Threaded in the outlet end of valve 22 is the threaded end 22' of an element 23 of a quick detachable flexible coupling which will be later described.

In Fig. 3 I have shown the outlet equipped with an automatic relief valve 24 which is connected to the riser 19 by means of a sweep T 25. A close nipple 26 is threaded into the top of the T and the valve 22 with the coupling element 23 thereon is threaded on the nipple. All outlets at or nearest the dead ends of the main or laterals are understood to be equipped with automatic relief valves.

These valves discharge upwardly and are provided with drainage openings 24' in the bottom to prevent corrosion due to water remaining therein after the valve closes.

Figure 4:
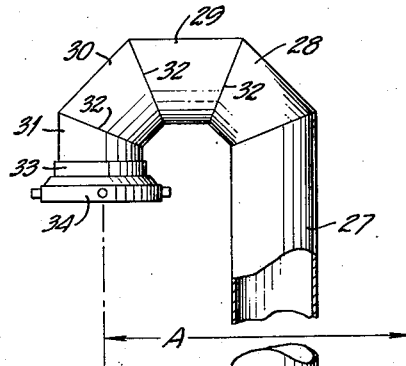
Fig. 4 is an S-shaped or gooseneck tube adapted to connect the outlets shown in Figs. 2 and 3 with the distributor pipe.

In order to connect the distributor pipe with the outlet I use the gooseneck pipe or tube 27 shown in Fig. 4. Instead of bending the tube, elbows are formed therein by sections such as 28, 29, 30 and 31, cut from a length of tubing and welded together along the joints 32. The end of the gooseneck tube at the 180° bend has welded thereto a flanged coupling element 33 with which cooperates a rotatable coupling ring 34 and the element 23 on the outlet to form a quick acting connection. The ring 34 is adapted to cooperate with the inclined surfaces 35 on element 23, as will be described hereafter, and lock the gooseneck to the top of the outlet. At the lower end there is welded to the grooseneck a coupling element 23 identical with element 23 on the outlet.

Figure 5:
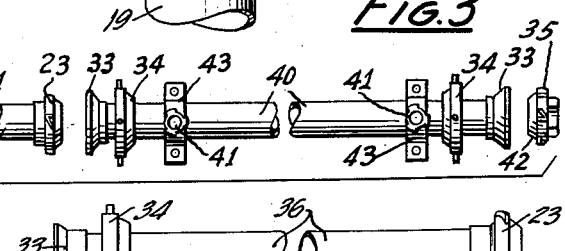
Fig. 5 is a plan view of one section of a distributor pipe.
Figure 6:
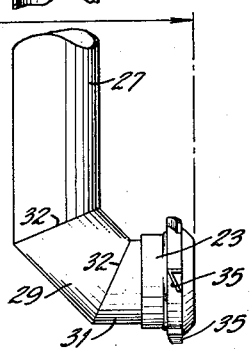
Fig. 6 is a plan view of the end section of the distributor pipe.
Figure 6:

Referring to Figs. 5 and 6, I have here illustrated the distributor pipe which is coupled to the end of the gooseneck 27.

In the layout illustrated, the distributor pipe comprises two straight tubes 36 and a tube 37 having a 90° elbow 38 at the end remote from the outlet. The tubes 36 and 37 are shown in detail in Figs. 5 and 6 and they are each provided with coupling elements 23 and 33 which are welded thereto, and each has a coupling ring 34 which cooperates with element 33 thereon and element 23 on the next tube. The sprinkler pipe 39 is coupled to the end of the distributor pipe.

It should be noted that the S-shaped or gooseneck tube 27 may be connected to the outlets so that the discharge end thereof will extend in any desired direction or azimuth. In any event it is important that this connection be of such character as to permit the discharge end to extend in at least three, and preferably four, directions differing approximately ninety degrees in azimuth, in order that the distributor pipe may connect with a sprinkler pipe at either side of the outlet and also in order that the gooseneck may be connected directly to the end of the sprinkler pipe when it is laid between the rows of trees nearest the outlet and maintain the correct position of the sprinkler heads in the space between the tree rows. To attain this last result the distance A in Fig. 4 should be equal to the distance A in Fig. 6.

Figure 7:
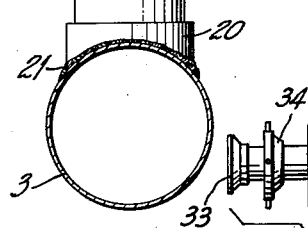
Fig. 7 is a plan view showing two disconnected sections of the sprinkler pipe and in which the section at the right is an end section.

Two tubes of the sprinkler pipe, including the extreme end tube 40, are shown in Fig. 7. The tubes going to make up the sprinkler are identical with the tubes 36 used in the distributor except in the length which is such as to bring the sprinkler head outlets in the center of the square formed by each four trees when the pipe is laid between the tree rows. Of course, it is understood that where the main is laid at one side of the zone separating groups of trees that an extra tube of appropriate length is used between the end of the distributor and the end of the sprinkler when necessary to bring the sprinkler heads in a central position with respect to the trees. The tubes in the sprinkler are provided with coupling elements 23 and 33 and coupling collars 34 all of which are identical with those on the distributor pipe. The last section 40 of the sprinkler pipe is provided with two sprinkler outlets 41 while the other tubes need have but one. The end tube 40 also differs from the other tubes in that, instead of having a coupling element 23 at one end, the element 33 is used at both ends, and the tube is also provided with two collars 34.

The dead end of the sprinkler pipe is closed by means of a plug 42. The outside of this plug is provided with peripherally spaced inclined elements 35 which cooperate with complementary surfaces within collar 34 to clamp the plug to the end of the pipe.

In order that the sprinkler pipe may be supported somewhat above the ground, each tube thereof is provided with a standard, represented generally at 43, and the end tube 40 is provided with two standards. These standards are conveniently combined with the sprinkler head outlets, as shown in Fig. 7.

While I have described my invention in its preferred embodiment, it is to be understood that the words which I have used are words of description rather than of limitation. Hence, changes within the purview of the appended claims may be made without departing from the true scope and spirit of my invention in its broader aspects.

What I claim is:

1. An irrigation system adapted for spraying orchards, groves and the like in which the trees are arranged in substantially equally spaced parallel rows, comprising a fixed underground water main having spaced outlets with valves and coupling units thereon disposed in a line approximately normal to said rows of trees, a surface distributor pipe comprising a plurality of thin, sheet metal tubes, whereby lightness and easy portability are combined with substantial water carrying capacity, provided with quick detachable means at the ends thereof whereby they may be coupled together and to one of said outlets and extend approximately parallel to said aligned outlets, and a surface sprinkler pipe comprising a plurality of tubes similar to the distributor tubes provided with quick detachable end means whereby they are adapted to be coupled together and to the end of said distributor pipe and extend substantially at right angles to said distributor pipe when positioned midway between adjacent rows of said trees; the tubes of said distributor pipe being of such length that they may be successively uncoupled and removed from the distributor pipe, and the sprinkler pipe successively moved to positions approximately parallel to and midway between tree rows nearer said outlets and coupled to the remaining portion of the distributor pipe.

2. In an irrigation system adapted for spraying orchards, groves and the like in which the trees are arranged in substantially equally spaced, parallel rows, the combination with a surface sprinkler pipe comprising a plurality of thin sheet metal tubes having quick detachable couplings thereon, of a fixed underground main having outlets therefrom provided with valves and coupling means and spaced apart along a line substantially normal to said rows of trees a multiple of the distance between adjacent rows of trees, and a surface distributor pipe comprising a plurality of thin, sheet metal tubes, whereby lightness and easy portability are combined with substantial water carrying capacity, provided with quick detachable end couplings whereby they may be coupled together and to said main outlets to conduct water therefrom; the length of said distributor pipe being sufficient to convey water to said surface sprinkler pipe when said sprinkler pipe is disposed parallel to said tree rows and substantially midway between that row of trees midway between said main outlets and the row of trees next nearer the main outlet to which said distributor is coupled; and the tubes of said distributor pipe being of such length that, upon removing sections thereof, said sprinkler pipe when moved to a position nearer the outlet to which said distributor is connected and substantially midway between two rows of trees can be connected to the remaining portion of said distributor pipe.

3. An irrigation system adapted for spraying orchards, groves and the like in which the trees are arranged in substantially equally spaced parallel rows, comprising an underground water main, an outlet therefrom including a vertical riser pipe open at the top and positioned on a line about midway between two of said rows of trees, a portable sprinkler tube extending along the surface of the ground and adapted to be positioned midway between two rows of trees to be sprayed, a portable distributor tube adapted to have the main body thereof positioned substantially at a right angle to said rows and having a relatively short portion extending substantially at right angles to said main body and provided with means adapting it to be coupled to the end of said sprinkler tube when said sprinkler tube is positioned midway between two rows of said trees, and an approximately S-shaped tube provided at one end with means for quickly coupling it to the end of said distributor pipe, and at the other end with means for quickly coupling it to the top of said riser with its plane selectively positioned substantially normal to said tree rows when connected to said distributor, or parallel to said tree rows; the length of said short portion of said distributor tube being approximately equal to the horizontal distance between the riser pipe and that end of said S-shaped tube remote from said riser when the same are coupled together; whereby, when said S-shaped tube is connected to said riser with its plane substantially parallel to said tree rows, the sprinkler tube, when positioned substantially midway between the two tree rows adjacent said riser may be connected directly to said S-shaped tube.

JOHN N. MOWERY.